3,794,588
HIGHLY-ACTIVE SUPPORTED CATALYSTS
Alvin B. Stiles, Wilmington, Del., assignor to E. I. du Pont de Nemours and Company, Wilmington, Del.
No Drawing. Continuation-in-part of application Ser. No. 834,156, June 17, 1969, which is a continuation-in-part of application Ser. No. 631,884, Apr. 19, 1967, both now abandoned. This application Sept. 23, 1971, Ser. No. 183,282
Int. Cl. B01j 11/06, 11/08, 11/22
U.S. Cl. 252—462                                11 Claims

ABSTRACT OF THE DISCLOSURE

Highly-active supported catalysts are prepared by slurrying a finely divided form of the catalytic material in a solution of the nitrate salt of the metal of the catalytic material, applying the slurry to a support, particularly one having a smooth surface, drying and calcining. In a preferred aspect, the supported catalyst also contains interspersants to stabilize the catalyst from crystal growth at high temperatures.

CROSS-REFERENCE TO RELATED APPLICATIONS

This application is a continuation-in-part of my copending application Ser. No. 834,156, filed June 17, 1969, which was a continuation-in-part of my application Ser. No. 631,884, filed Apr. 19, 1967, both now abandoned.

BACKGROUND OF THE INVENTION

This invention relates to supported catalysts and to a process for the preparation thereof.

It has been difficult to make supported catalysts when the support material has a smooth surface. This is particularly true of rugged support materials which are usually very dense, non-porous and have smooth surfaces. Thus, U.S. 3,317,439 describes the preparation of supported catalysts wherein the support must be porous.

Conventional processes are known in the art for improving the surface porosity or the surface area of catalyst supports such that under microscopic conditions they will appear to have an unsmooth surface. However, it is not necessary to use these conventional techniques to make the supported catalysts of the invention. The supported catalysts can be made by the process of the present invention from catalytic supports having surfaces which are microscopically smooth.

SUMMARY OF THE INVENTION

I have found that highly active supported catalysts can be prepared if very finely divided, highly-active catalytic materials are suspended or slurried in at least one metal nitrate, preferably the nitrate of the metal of the catalytic material. In this manner a relatively thick layer of the slurry can be applied or caused to adhere to the smooth surface of the support. If an interspersant is used, the catalytic material and interspersant can be slurried in the nitrate salt of the interspersant with the same results. After this supported catalyst has been dried and calcined, the catalytic coating is porous, strongly adherent to the support, abrasion resistant, and, most importantly, it is extremely active from a catalytic standpoint.

The supported catalysts of the invention contain as the catalytic material the oxides, hydroxides, carbonates, uranates, chromates, chromites, cerates, tungstates, vanadates, and molybdates of nickel, cobalt, silver, iron, chromium, calcium, zinc, tin, bismuth, palladium, platinum, ruthenium, uranium, arsenic, antimony, thallium, copper, and the rare earths including lanthanum or elemental platinum, pallidium, ruthenium, rhodium, iridium, or osmium or mixtures thereof.

These catalytic materials are applied to the support after they have been suspended or slurried in a solution containing at least one nitrate of the catalytic metals above.

Definition: Wherever in this text the term "nonporous support" is employed, it is understood that the material will, when immersed in boiling water, absorb less than 0.1 percent of its weight as water. The determination is made by first weighing the support material, immersing it in water, and boiling for a period of five minutes; allowing the support and water to cool to room temperature, removing the support from the water, removing the excess water on the surface by blotting with filter paper, for example, then weighing to determine the weight after water adsorption. Finally, one subtracts the weight before immersion in the boiling water from the weight after immersion, and divides the difference by the original weight. When expressed percentagewise this weight change should be less than 0.1% for the support to qualify as a nonporous material. Additionally, such support materials usually have a smooth, glossy or glass-like surface.

DETAILED DESCRIPTION OF THE INVENTION

In a preferred catalyst, an interspersant is present. The interspersant is a refractory material which melts above 1000° C., and in making the supported catalysts of the invention it is added to the slurry in such amounts that when the metal nitrates are decomposed by heating, the refractory acts as an interspersant for the crystallites and metal oxides so produced and thereby stabilizes the catalytic coating against crystallite growth and inactivation at high temperatures. The interspersant can be added as a nitrate salt, and thus add to the film forming properties of the dried and calcined, thinly-applied surface coating of the slurry.

The support material useful in the supported catalysts of the invention can be any type of support material, i.e., porous materials with smooth or rough surfaces. One advantage of supported catalyst of the invention is that highly active catalytic materials can be supported on materials having smooth surfaces. Exemplary of useful support materials are the following: glass, metals, fused alumina, fused silica, mullite, beryl, zirconia, zircon, porcelain, dense sintered alumina, chromia, spinel, magnesia, fused magnesia, lanthana and titania.

The catalyst of the invention is particularly useful when the support material is a mullite or alumina honeycomb made by the in situ oxidation of aluminum honeycomb as described in U.S. Pat. 3,255,027 to Talsma. In this process an aluminum foil honeycomb is coated with a fluxing agent, e.g., sodium silicate, and fired in an oxygen atmosphere to oxidize the aluminum to alumina. Silicon carbide can be combined with the fluxing agent to oxidize the aluminum to mullite. For further details on the process, reference can be made to the Talsma patent.

The size and the form of the support is immaterial and it can be orientated or unorientated, thus it can be in the form of a honeycomb or it could be in the form of pellets, random granules, spheres, corrugated shapes, bars, rods, tubes, rolls, saddles, screens, beads, spirals, coils, spheres, or any of the conventional shapes of the art.

The catalysts of the invention are highly effective in that the entire surface of catalyst and particularly the external portions where normally catalytic reactions take place are composed of the catalytic material.

Preferred catalytic materials are the oxides, carbonates, uranates, chromites and cerates of nickel, cobalt, iron, chromium, tin, bismuth, palladium, platinum, ruthenium and rhodium.

Typical catalytic materials which are suitable for use in the method of the invention include: copper chromite, calcium chromate, ferrous chromite, cobalt chromite, nickel chromite, nickel oxide, calcium molybdate, calcium tungstate, calcium vanadate, ferrous tungstate, cobaltous tungstate, nickelous tungstate, cupric tungstate, calcium cerate, copper cerate, bismuth molybdate, antimony uranate, calcium oxide, silver oxide, cuprous oxide, chromic oxide, and cobaltic oxide.

The catalytic material when added to the slurry used should be in a finely divided form. The crystallite size of the ultimate particle should be less than 1500 Angstroms in its greatest dimension and preferably less than 100 Angstroms. Such particles are most preferably in the form of unitary crystals and if in the dry form they should be pulverulent to the ultimate particles. Ideally, the form is a colloidal suspension in which the particles are all in the range mentioned, though dispersions or suspensions can be used in which there is some aggregation of particles.

The determination of crystallite size can be made by conventional X-ray analytical techniques. A suitable method is shown in X-ray Diffraction Procedures by H. P. Klug and L. E. Alexander, published by John Wiley & Sons, New York, 1954 edition.

Instead of using just the catalytic active material, it is often desirable to aggregate this material with an interspersant by techniques known in the art. Thus the catalytic material or materials selected and slurried can first be formed into aggregates in which the crystallites of the catalytic material are kept apart by a refractory material which melts above 1000° C. and which is called an interspersant.

To make these aggregates a colloidal dispersion or a suspension of an active catalytic material, as described, is placed in a liquid medium, preferably water, and to this is added the interspersant. The interspersant is in solution or in colloidal dispersion, or suspension or can be formed in situ by chemical reaction between suitable reactants.

The interspersants, the chemical nature of which will be described further hereinafter, are of a size comparable to the catalytic material. Thus the crystallite size should preferably not be notably larger than 1500 Angstroms and it is more preferred that the size be no greater than 500, and, still better, no greater than in the range of about 50 Angstroms.

After the interspersant has been added to the catalytically active material as described, the catalyst distended with the interspersant is then dried and heated further to remove water and to decompose the catalyst, if need be, and the interspersant, if need be.

The calcination temperature should be below that at which sintering occurs and it is generally between 200° and 500° C.

After the calcining, the interspersant can be part of the catalyst, that is, it can be a solid solution with the catalytic material; or it can react with the catalytic material to form materials such as a spinel. On the other hand, it can be just a physical admixture.

The resulting catalytic agglomerate should have a particle size of less than 150 mesh; this can be accomplished by conventional milling techniques.

Additional details on how such an interspersant can be incorporated, or further how a second interspersant can also be incorporated into the catalytic agglomerate can be found in U.S. Pat. 3,317,439, and the disclosure of this patent is incorporated herein by reference.

The preparation of the slurry ordinarily begins by forming a dispersion of the catalytic material or the above described agglomerate, with a nitrate of one of the catalytic materials, preferably the nitrate of the same metal as the catalytic material. However, the nitrate can be that of the interspersant or of a different catalytic metal provided a catalytic composite is formed in the latter embodiment, i.e., the two materials are catalytically satisfactory to each other.

Thus useful nitrates include aqueous solutions of the nitrates of nickel, cobalt, silver, iron, chromium, zinc, tin, bismuth, palladium, platinum, ruthenium, uranium, arsenic, antimony, thallium, calcium, copper, and the rare earths, or mixtures thereof. These nitrates after being calcined will be converted to the corresponding oxide. These oxides are easily reducible, i.e. reducible with hydrogen at temperatures less than 600° C.

The slurry is then produced by adding the nitrate and catalytic material together with rapid agitation, milling or grinding. The catalytic material should be at least 1% and preferably at least 3% of the slurry and can range as high as 97%.

The nitrate should be at least 3% of the slurry in order to have proper adhesion to the support and can range up to as high as 75% of the slurry. Generally, the nitrate will be between 20 and 40% of the slurry.

The slurry then can be applied to the support by conventional means such as spraying, dipping, immersion, or any other suitable techniques.

In making preferred catalysts, the slurry also contains an interspersant in order to produce a thermally stable catalyst. This interspersant will be in addition to any previously agglomerated with the catalytic material. The purpose of this interspersant is to act as an interspersant for the crystallites of metal oxide produced upon decomposition of the metal nitrates during subsequent heatings, thus stabilizing the catalytic coating against crystallite growth.

Useful interspersants, either for incorporation in the catalytic agglomerates or to intersperse the crystallites formed from the metal nitrates, include the previously mentioned catalytic materials or other materials not catalytically harmful, as long as the material has a melting point above 1000° C.

The interspersants are of a size comparable to the catalytic material. Thus the crystallite size should preferably not be notably larger than 1500 Angstroms in its greatest dimension, and it is more preferred that the size be no greater than 500, and still more preferred no greater than 50 Angstroms.

Suitable interspersants include, in general, any refractory material which is or can be in the form of crystallites in the size range described. Preferred interspersants are the following: beryllium oxide, magnesium oxide, calcium oxide, zinc oxide, cadmium oxide, barium oxide, strontium oxide, aluminum oxide, lanthanum oxide, silicon oxide, titanium dioxide, zirconium oxide, hafnium oxide, chromic oxide, maganese oxide, barium titanate, zirconium silicate, magnesium aluminate, cerium oxide, calcium titanate, aluminum chromite, barium silicate, zirconium silicate, magnesium silicate, calcium silicate, strontium silicate, magnesium titanate, strontium titanate, calcium titanate, barium zirconate, magnesium zirconate, calcium zirconate, strontium zirconate, barium cerate, magnesium cerate and calcium cerate.

With respect to the interspersant used, it is of course obvious that in some applications the condition for which the final catalyst will be used will determine which interspersants can be used. Thus, in an operation such as methane reforming where one has $CO_2$ present at high temperatures, one would not use strontium, barium or calcium because these compounds would form carbonates and spalling of the catalyst would occur.

The slurry would preferably contain at least 1% to 95% interspersant, and a preferable lower limit would be about 5%.

The slurry containing the catalytic material and the nitrate and, optionally, the interspersant is then applied to the support. The slurry can be applied by any of the conventional means such as spraying, dipping or immersion. After the slurry has been applied to the support, which under some circumstances can be two or three different sprayings or dipping with a drying step interposed in between, the coated support is then air dried and calcined or if desired it could be calcined immediately without the intervening air-drying step. The coating thus applied can range in thickness from a monomolecular layer up to a thickness of 10.0 mils. The thickness used in not critical and depends upon the conditions of the catalytic reaction for which the catalyst is to be used. It is one of the advantages of the invention that layers of catalytic materials having a thickness approaching 10 mils can be caused to adhere to the smooth surface of the support.

The temperature of the calcining operation should be that which would be sufficient to decompose the nitrate hydrate or nitrate present to the corresponding oxide and usually will be in the range of 100 to 350° C. but can range as high as 700 to 800° C. The calcining step should be conducted at such a rate that spalling or explosive decrepitation are avoided; otherwise the timing is not critical.

It is essential that there be several pauses during the calcining operation as the temperature rises from 100° C. to the final calcining temperature. The first pause is at a temperature sufficiently high to cause the dehydration of the nitrate at a slow enough rate that no efflorescence of the nitrate salt or other soluble salts occurs. Efflorescence means that a soluble salt is carried to the surface by water of hydration during the evolution of the water of hydration and at the surface the salt is essentially detached or only loosely bonded to the catalyst entity on the support material. However, if the nitrate used does not contain any water of hydration, this first pause is not necessary. The second essential pause is at a temperature above that during which the dehydration occurs and is the true melting point of the anhydrous nitrate salt. The pause is for just sufficient time to allow the nitrate to thoroughly melt and form an adhesive bond between the catalyst entity on the surface and the surface of the support material. Usually, 5 minutes pausing at each of these temperatures is adequate. Finally the temperature is raised another step until the decomposition temperature is reached, which is the highest temperature, and the temperature of exposure for the longest period of time.

Ordinarily the temperature at which a nitrate salt is dehydrated can be determined from a handbook figure. The true melting point of the anhydrous nitrate salt also is obtainable from a handbook compiling physical data for chemical salts. Furthermore, the temperature of calcining to decompose the nitrate is usually also available from such compilations. As an example, the Handbook of Chemistry and Physics, published by the Chemical Rubber Company, shows that cobalt nitrate loses 3 molecules of water at 55° C. However, the last 3 molecules are lost at a temperature of approximately 115° C. The melting point of cobalt nitrate is given as being in excess of 100° C. As a matter of fact, the temperature that has been found by practice to be most satisfactory is 145° C. so that a pause at 110° C. and another at 145° C. would be required for the dehydration and the melting operation. Calcining then would be completed at 400° C.

In such cases where insufficient information is available in the literature, several exploratory tests can be made which will indicate the temperatures at which pauses should be made for the dehydration and melting as well as the decomposition of the nitrate salt.

Although it has been mentioned that 5 minutes is adequate for the dehydration and melting operations, there is no reason why longer periods cannot be used except that longer periods involve added cost and for an industrial preparation this is usually not justifiable or necessary.

Though not an essential feature catalytic promoters can be present. They would be added to the slurry before it is applied to the support and calcined. Thus barium nitrate, calcium nitrate, chromium nitrate, and the like can be added.

After the calcining step, if necessary, the conventional activating treatments can be conducted. Thus, the catalyst can be reduced, oxidized, chlorinated or brominated, sulfated, sulfited, or sulfided.

The catalyst of the present invention can be used in the same way as the prior art catalyst containing the same active catalytic materials. Specific catalysts and suggested uses will be given in the examples. Exemplary of the uses of the catalysts of the invention are the use of nickel in methane reforming and hydrogenation in general, cobalt in the hydrogenation of material such as adiponitrile to hexamethylenediamine, silver for olefinic oxidations and oxdation of methanol to formaldehyde, iron for the preparation of ammonia synthesis gas, and the use of copper and silver for dehydrogenations.

In order that the invention may be better understood, reference should be made to the following illustrative example. In the examples, parts refer to parts by weight unless otherwise indicated.

Example 1

Nickel nitrate hexahydrate equivalent to 330 parts of nickel is dissolved in sufficient distilled water to produce a total solution equivalent to 16,000 parts. To this solution is added 170 parts of finely divided alumina hydrate (the alumina hydrate is 60% aluminum oxide). The slurry is heated to a temperature of 85° C. while being rapidly agitated. Then ammonium carbonate is added to the solution at the rate of 5 parts per minute until a pH of 7.2 is reached. The slurry thus obtained is filtered and washed on the filter to remove soluble salts. Thereafter, the filter cake is dried and calcined at 400° C.

200 parts of the powder thus obtained is slurried in 200 parts of distilled water containing additionally 100 parts of nickel nitrate hexahydrate and 27 parts of alumina hydrate of the type previously used.

The slurry thus obtained is milled in a conventional ball mill for 18 hours to produce a paste-like material which is discharged into a suitable container. This material is applied to a support structure which is an alumina honeycomb made by the in situ oxidation process of U.S. Pat. 3,255,027. The honeycomb structure is coated by immersion in the paste-like material obtained from the above milling operation.

The coated honeycomb structure now having a thin layer of slurry is dried at 105° C., then the temperature is raised to 125° C. for 5 minutes to permit the final dehydration of the nitrate. Thereafter the temperature is raised to 150° C. where the anhydrous nickel nitrate salt is melted and the temperature is maintained at this level for 5 minutes. After this 5-minute period at 150° C., the temperature is raised as rapidly as possible to 700° C. and maintained at this temperature for 3 hours.

In this example the initial immersion produced a sufficient layer of catalytic material in one dip; if however it is desired to have a thicker layer, the ceramic honeycomb with the first coating still attached can again be recoated, redried and processed as described above. By repeated coatings a layer of any desired thickness can be obtained.

The catalyst thus derived is effective for the conversion of methane and steam to carbon monoxide and hydrogen. It is also useful for dehydrogenation or hydrogenation reactions.

Example 2

(1) 63 parts by weight of copper as copper sulfate and 130 parts by weight of zinc as zinc sulfate are dissolved in 2000 parts by weight of distilled water.

(2) 318 parts by weight of sodium carbonate is dissolved in 2000 parts by weight of water. This solution is added to the one prepared in item 1 above to effect precipitation. The precipitate is washed to remove the sulfate ion and is filtered.

(3 The filter cake is dried and is calcined at 425° C. for two hours.

(4) The calcined filter cake is kneaded with sufficient water to make a paste. There is added to the paste barium hydroxide equal to 25% by weight of the calcined powder. The whole pasty mass is kneaded in a carbon dioxide free atmosphere for one hour to make it homogeneous. The barium hydroxide, because of solubility in water will become very finely divided and will find its way into the interstices of the calcined powder. Upon later calcination it converts to barium oxide of very fine crystallite size.

(5) The kneaded paste after drying is calcined at 325° C. for two hours. After calcination, the dried mass is crushed and screened to form particles of less than 150 mesh.

(6) 100 parts of the particles are mixed with 100 parts of hydrated copper nitrate in 250 parts of water. The resulting paste is then applied to a fused alumina support which is in the shape of a rod. The coated rod is dried for 10 hours at 100° C. after which the temperature is raised to 115° C. and held at this temperature for 10 minutes. Thereafter it is raised to 150° C. and held for an additional 10 minutes. Final calcining is conducted at 400° C. for 2 hours after this temperature is reached.

The catalyst as thus prepared is useful for conversion of carbon monoxide in the presence of steam to carbon dioxide and hydrogen. It is also useful for cyanation reactions in which the nitrile group was added to organic molecules under conventional reaction condition.

Example 3

(1) 81 parts by weight of zinc oxide is mixed with 55 parts by weight of manganese as manganese nitrate hexahydrate.

(2) To this mixture is added 50 parts by weight of zirconium silicate as a finely divided powder, the ultimate particles of which are in the colloidal range or are readily reducible to such size.

(3) The mixture is heated to the point of fusion while being stirred and decomposition is effected until decomposition is finished.

(4) The calcined material is mixed with lanthanum nitrate and fusion is repeated until the decomposition of the nitrate is completed. The resulting material is then milled to less than 325 mesh.

(5) To 500 parts of this material, 500 parts of chromium nitrate monohydrate in 300 parts of water is added. This mixture is then milled for 16 hours.

(6) The resulting thixotropic material is applied to an alumina honeycomb by immersion. The film is then dried to produce a coating approximately 6 mils thick on the support.

(7) The structure is then dried at 100° C. for 10 hours after which the temperature is raised to 125° C. for 15 minutes, then to 160° C. for an additional 5 minutes after which the temperature is increased to a final calcining temperature of 475° C. and maintained at this temperature for 1 hour.

(8) The catalyst produced can be used for the oxidation of alcohols to acids. It can be used for the oxidation of hydrochloric acid to free chlorine and water vapor. It can be used for the decomposition of organic peroxides and hydroperoxides.

The catalyst prepared as above is also useful for the oxidation of ammonia to nitric oxide and for the oxidation of sulfur dioxide to sulfur trioxide, the oxidation of organic aldehydes to organic acids and for the hydrogenation of butadiene to butylene, all under conventional reaction conditions. The catalyst can also be used for reduction of nitrogen oxides and, after addition of air, for the oxidation of carbon monoxide, hydrocarbons, and other combustible materials in automobile exhaust fumes.

Example 4

(1) 170 parts by weight of silver nitrate and 184 parts by weight of magnesium nitrate dihydrate are dissolved in 2,000 parts by weight of water.

(2) A 10% sodium carbonate solution is added to the solution prepared in Step 1 to cause complete precipitation and the precipitate is washed to remove the sodium nitrate.

(3) The mixture of silver and magnesium carbonates obtained as a filter cake is dried, heated to 700° C. to effect decomposition of the carbonates.

(4) The dried product is kneaded with sufficient water to form a paste and 25 parts by weight of finely divided zirconium silicate are mixed into the kneaded paste until the paste is again uniform. Sixty minutes will be required.

(5) The wet cake is dried, ground, and 100 parts of the powdery product is mixed with 50 parts of silver nitrate in 100 parts of water and milled. The resulting slurry is applied to fused alumina spheres.

(6) The fused alumina spheres with catalytic coating are now dried at 110° C. for 12 hours. Inasmuch as there is no water of hydration of silver nitrate, it is not necessary to effect a pause for the evolution of the water of hydration. Consequently, the temperature is raised promptly to 112° C., the melting point of siver nitrate and maintained at this temperature for 5 minutes. Thereafter the temperature is increased to 350° C. and maintained at this level for final decomposition of the silver nitrate.

This catalyst is useful for oxidations such as methanol to formaldehyde and ethylene to ethylene oxide. It is also useful for the addition of halogens to the double bonds of olefins or diolefins.

Example 5

(1) 180 parts of cobalt as cobalt nitrate is dissolved in 8000 parts of distilled water. Two parts of silica as colloidal silica sol known in the trade as "Ludox" and having a spherulite size of 7 millimicrons is added as a 5% aqueous dispersion to the cobalt-nitrate solution.

(2) The cobalt-nitrate solution is heated to 80° C. and ammonium carbonate is added slowly as a 10% solution until a pH of 7.6 is reached. At this point the addition of ammonium carbonate is stopped and agitation is continued for 1 hour while the temperature is simultaneously maintained at 80° C. Thereafter the cobalt carbonate with occluded silica is filtered, washed with distilled water to remove excess ammonium nitrate, then is dried and finally calcined at 400° C.

(3) 100 parts of the powder so derived is placed in a mill together with 10 parts of elemental cobalt as cobalt nitrate hexahydrate and 125 parts of distilled water. These are milled together to produce a homogeneous, thixotropic paste. ¼ inch diameter cylinders, ¼ inch long with ⅛ inch centered hole and fabricated from sillimanite, are immersed in the thixotropic slurry and all are completely coated. After coating, excess paste is drained from the sillimanite rings and the moist rings are then dried at 105° C. for 12 hours. Thereafter the temperature is increased to 125° C. to complete the dehydration and is maintained at this temperature for 15 minutes. Next the temperature is increased to 170° C. and is held at this temperature for the completion of the fusion of the cobalt nitrate salt. After the pause at 170° C. the temperature is raised as rapidly as possible to 500° C. where it is maintained for 5 hours.

The film thus formed is approximately 2.5 mils thick. After cooling, the once coated rings are immersed in the same paste and are again drained and dried and calcined in the same sequence of operations as previously described.

(4) After reduction in hydrogen at 400° C., the reduced cobalt catalyst is effective for the hydrogenation of nitriles to amines, for the hydrogenation of dinitriles to diamines and for the hydrogenation of organic nitro compounds to the corresponding amines. Furthermore, without reduction, the catalyst is useful for the liquid phase oxidation of cyclohexane to cyclohexanone and cyclohexanol and for the oxidation of acetaldehyde to acetic acid.

Instead of the colloidal silica called for above, there can be used colloidal titania, zirconia, zirconium silicate or any of these colloidal materials to which has been applied a mono- or multi-molecular layer of multivalent metal hydroxides such as those of thorium, aluminum, magnesium, chromium, rare earths, alkaline earths and manganese.

Instead of the cobalt nitrate specified to be added to the ball milling operation, there can be used nickel, iron, chromium, calcium, copper, and the rare earths in mixture or individually as nitrate salts, making appropriate adjustments in the temperature pauses for dehydration and fusion of the nitrate salt. Such catalysts are useful for the operations mentioned above as well as for dehydrogenations, dehydrohalogenations and for the complete oxidation of noxious fumes in exit gases from manufacturing operations, chemical operations and exhaust gases from internal combustion engines.

Example 6

A bismuth silicophosphomolybdate catalyst is prepared by methods known in the art (see U.S. Pat. 3,044,966, Example A). The atomic ratio of bismuth to molybdenum to phosphorus to silicon would be 2:3:0.05:5. 100 parts of the catalyst so prepared is put into a ball mill together with 150 parts of water and 50 parts of anhydrous uranium nitrate. They are milled together to produce a uniform thixotropic paste. The paste is used to coat a silicon-carbide refractory in the form of ¼ inch irregular granules. The coated granules are dried at 100° C. for 10 hours and are then heated for 15 minutes at 135° C. to effect the dehydration of the uranium nitrate which has become rehydrated because of exposure to the water in the paste. Thereafter the coated granules are increased in temperature to 145° C. where the uranium nitrate melts into the mixture and bonds the catalyst coating with the smooth surface support. Finally, the temperature is raised to 700° C. for the final decomposition and calcining operation for a period of 3 hours at this temperature. The catalysts thus derived are effective for the oxidation of propylene to acrolein and acrylic acid and the conversion of air, propylene and ammonia to acrylonitrile. It is furthermore useful for the oxidation of ethylene and propylene to the respective oxides and unsaturated aldehydes.

Instead of the bismuth molybdate promoted with phosphorus but still supported on colloidal silica, there can be used a mixture of oxides of bismuth, arsenic and uranium or the oxides of antimony and uranium; thallium and antimony; copper, molybdenum and uranium; molybdenum and arsenic or instead of the arsenic in this latter catalyst one can use antimony; finally one can use instead of the bismuth molybdenum phosphorus oxides mixture of rare earths with molybdenum and vanadium oxides.

Instead of the uranium nitrate there can be used the nitrates of calcium, zinc, chromium, or their mixtures.

The paste as prepared from the bismuth silicophosphomolybdate and uranium nitrate in the early part of this example is used to paint the surface of the converter in which the reactions were tested and the result was decreased losses in conversion to unwanted by-products catalyzed by the bare walls of the reactor.

Example 7

1000 parts of a 1 molar zinc-nitrate solution is placed in a suitably sized glass vessel fitted with an agitator and there is added thereto 1000 parts of a 1 molar chromium-nitrate solution. A concentrated ammonium-carbonate solution is added to the rapidly agitated solution at 60° C. until the pH has reached 7.0 and the zinc and chromium are completely precipitated as the carbonates. After 1 hour digestion at 60° C. the carbonates are filtered, washed and then calcined at 400° C. for 3 hours. 100 parts of the calcined powder is placed in a ball mill together with 25 parts of a stoichiometrically equivalent mixture of zinc nitrate and chromium nitrate together with 160 parts by weight of distilled water. The slurry is milled for 6 hours to produce a homogeneous and thixotropic paste. This paste is used to coat by spraying high density, low porosity, α-alumina in the form of saddles which are ⅜ inch from side to side. The coating thus derived is dried at 105° C. for 12 hours, then is taken slowly through the temperature range of 135–150° C. to cause the dehydration of both the zinc and chromium nitrate salts. A 20-minute period is allowed traversing this temperature differential. After this period the temperature is raised to 155° C. and the temperature is maintained for a period of 30 minutes, slowly progressing through the interval 155–185° C. to effect melting of both nitrates. After this period of time the temperature is raised to 385° C. for 2 hours to complete the decomposition. The catalyst thus produced after reduction was effective for the conversion of a mixture of carbon monoxide and hydrogen to methanol. It was also effective for the addition of carbon monoxide to olefins and for other carbonylation reactions and for the dehydration of alcohols to α-olefins.

Instead of the zinc and chromium ions specified above, there can be used stoichiometric equivalents of iron to replace the zinc and one-third of the stoichiometric equivalent of the chromium as aluminum. The milling and other processing remains the same as above with the exception that the zinc is replaced by iron and the chromium is replaced one-half with aluminum, one quarter with calcium and one-quarter with potassium. After calcining at 600° C. the catalyst was effective for the synthesis of ammonia from hydrogen and nitrogen at low pressures in the range of 1500 p.s.i. and low temperatures in the range of 315° C. Instead of the α-alumina specified for the saddle shape structures, there can be used stainless steel type 316, 304 or 329 "Nichrome," "Inconel" or ceramics other than alumina such as sillimanite, mullite, zirconia, zircon, silicon carbide and magnesite.

Example 8

Three hundred fifteen parts by weight of barium hydroxide octahydrate is slurried in 2000 parts by weight of distilled water. There is next added to the slurry 100 parts of chromic acid anhydride, $CrO_3$.

The slurry is heated to 90° C. with agitation to effect reaction of the chromic acid with the barium hydroxide to produce barium chromate.

The barium chromate is removed from the slurry by filtration and is dried.

Fifty parts by weight of the dried barium chromate precipitate thus obtained is milled with 150 parts by weight of distilled water and 35 parts by weight of anhydrous barium nitrate. Milling is continued until a uniform suspension is obtained.

The resultant suspension is used to coat alpha alumina in the form of honeycomb structure having ⅛" cells and being 4" in diameter and 1" thick.

The support with coating is dried at 110° C., then is heated to 600° C. where melting and decomposition are effected; exposure to 600° C. is for 2 hours.

The resulting catalyst is useful for complete oxidations such as the abatement of combustible and odorous fumes from internal combustion engines or industrial operations, for example paint and enamel drying operations, or other operations in which solvents are evolved.

Useful catalysts for similar operations can be obtained by following the above procedure, except using 121 parts of anhydrous strontium hydroxide, instead of 315 parts of barium hydroxide, and subsequently in the instructions using 35 parts by weight of strontium nitrate instead of the same quantity of barium nitrate. Appropriate changes are also made in the temperatures of pauses for dehydration, melting and calcining.

Useful catalysts for similar operations and also for ester hydrogenations under suitable operating conditions can be obtained by substituting 97 parts by weight of anhydrous cupric hydroxide for the barium hydroxide, and 40 parts by weight of copper nitrate trihydrate for the 35 parts by weight of barium nitrate.

Example 9

A solution is prepared by dissolving 290 parts by weight of nickel nitrate hexahydrate and 100 parts by weight of chromic acid anhydride in 2000 parts of distilled water.

The solution is agitated and heated to 40° C., and then 28% ammonium hydroxide solution is added to a pH of 6.8. The slurry is allowed to agitate for one hour, then the precipitate is filtered, and the filter cake washed with additional distilled water to remove the nitrate ion. Then the washed filter cake is finally calcined at 400° C. for 3 hours after reaching temperature.

The powder thus derived is made into a mill charge of 50 parts of the powder, 125 parts of distilled water, and 40 parts of nickel nitrate hexahydrate. After milling to produce a fine suspension, the suspension can be used to coat ceramic or metallic articles as described in the foregoing examples. The catalyst produced after heating to dehydrate, melt and decompose the nickel nitrate adhesive is useful for steam hydrocarbon reforming or for the removal of trace quantities of carbon monoxide from synthesis gases by the methanation reaction.

A similar catalyst can be prepared by substituting 35 parts by weight of anhydrous chromium nitrate for the 40 parts by weight of nickel nitrate hexahydrate when producing the suspension to be used for the coating operation.

A catalyst useful for fume abatement, and under the proper conditions, for hydrogenation of organic nitrile groups, can be obtained by following the procedure given above, except using 290 parts by weight of cobalt nitrate instead of nickel nitrate and 40 parts by weight of cobalt nitrate instead of the nickel nitrate when preparing the coating slurry. Chromium nitrate can also be substituted in this case for the cobalt nitrate if desired.

A useful catalyst can also be obtained by the procedure described for the nickel nitrate except substituting a stoichiometric quantity of copper in those places where nickel is used.

A useful fume abatement catalyst can be made following the procedure given above for the nickel chromite except substituting 150 parts by weight of anhydrous manganese nitrate for the 290 parts by weight of nickel nitrate and substituting 50 parts by weight of manganese nitrate for 40 parts of nickel nitrate when preparing the coating slurry. Instead of the manganese nitrate one can also use 40 parts by weight of chromium nitrate when preparing the coating slurry.

Example 10

A solution is prepared by dissolving 362 parts by weight of potassium tungstate dihydrate in 5000 parts by weight of distilled water at 60° C. A second solution is prepared by dissolving 164 parts by weight of anhydrous calcium nitrate in 2000 parts by weight of distilled water, also at 60° C.

While the potassium tungstate solution is being rapidly agitated, the calcium nitrate is added over a period of 15 minutes. A precipitate of calcium tungstate is formed, filtered, washed on the filter, and dried.

Fifty parts by weight of the calcium tungstate thus obtained is milled with 150 parts by weight of distilled water and fifty parts by weight of calcium nitrate anhydride.

The milled slurry can be used to coat ceramic and metallic particles, as described in previous examples to produce, after heating to dehydrate, melt and decompose the calcium nitrate adhesive, a catalyst useful for oxidation of methanol to formaldehyde or propylene to acrolein, according to procedures known in the art.

Instead of the calcium nitrate recited above in this example, a catalyst can be prepared using 290 parts of nickel nitrate hexahydrate in the precipitation and 40 parts of nickel nitrate in the preparation of the coating slurry.

A useful catalyst can be prepared by following the procedure for the preparation of the calcium tungstate, but substituting 290 parts by weight of cobalt nitrate hexahydrate for the 140 parts by weight of calcium nitrate in the precipitation of the calcium tungstate and 40 parts by weight of cobalt nitrate hexahydrate for the calcium nitrate used in the preparation of the coating slurry.

Useful molybdate catalysts can be made by substituting 205 parts by weight of sodium molybdate for the 362 parts by weight of potassium tungstate recited in each of the preparations above in this example.

Example 11

One hundred parts by weight of cerium nitrate hexahydrate is intimately mixed as a powder with 65 parts by weight of anhydrous barium nitrate. The thoroughly and uniformly mixed salts are heated gradually to 1200° C., at which point the nitrates have fused and subsequently decomposed, and a solid barium cerate has been produced.

Fifty parts by weight of the barium cerate is milled with 200 parts by weight of distilled water and 100 parts by weight of cerium nitrate hexahydrate to produce a uniform suspension.

After heating to effect dehydration, melting and decomposition of the cerium nitrate adhesive, a catalyst is obtained which is useful for dehydration of alcohols and for complete oxidations such as those required for fume abatement.

A useful catalyst can be prepared following the procedure described above, but substituting 46 parts by weight of magnesium nitrate dihydrate for the 65 parts by weight of anhydrous barium nitrate in the preparation of the fused material. In the preparation of the suspension, 80 parts by weight of magnesium nitrate is used to replace the barium nitrate.

A useful catalyst having high thermal stability in abatement operations can be prepared by following the procedure described for the preparation of the barium cerate, but by substituting 47 parts by weight of beryllium nitrate trihydrate for the anhydrous barium nitrate. A beryllium cerate is produced which can be applied to nonporous surfaces, after making a suspension using 100 parts by weight of beryllium nitrate instead of the barium nitrate specified above in this example.

A highly active fume abatement catalyst can also be made following the procedure of this example, but utilizing 49 parts by weight of anhydrous manganese nitrate for the barium nitrate stipulated above. The fusion produces a mixture of manganese cerate and cerium manganate and this can be applied to the support materials by the preparation of a suspension utilizing either 65 parts by weight of anhydrous manganese nitrate or 70 parts by weight of cerium nitrate in the preparation of the suspension. Stoichiometrically equivalent parts of the cerium or barium can be substituted for the other to produce a combination of cerium and barium nitrates for the preparation of the suspension.

The following Example 12 shows that the catalysts prepared by the process of the present invention have unexpected and superior properties as compared with those of the prior art.

Example 12

(A) Copper nitrate trihydrate (241 g.), 100 g. of chromium trioxide, and 0.6 g. of colloidal silica as a 30% solids by weight suspension of colloidal 15 millimicrons spheres in water were dissolved in 2000 milliliters of distilled water. The solution was heated to 80° C. with agitation. While the agitation was continued, a 10% solution of ammonium carbonate was added to bring the pH to 6.9. The resultant slurry was agitated for an additional one-hour period, filtered, and washed on the filter; and the filter cake was dried and calcined at 400° C. to produce a finely divided catalytic powder.

A portion of the above powder (100 g.) was milled together with 41 g. of copper nitrate trihydrate, 68 g. of chromium trinitrate nonahydrate, and 200 milliliters of distilled water in a ball mill charged with ½ inch ceramic balls. The slurry was milled for 5 hours and poured over 200 grams of sintered, nonporous alumina cylinders ⅛ inch in diameter by ⅛ inch in length. After the alumina cylinders had been thoroughly moistened with the slurry, the excess slurry was drained off, and the moist pellets were dried at 105° C. with intermittent stirring to assure uniformity of coating and impregnation; then was heated to 115° C. where dehydration and melting of the copper nitrate occurred. Thereafter, the pellets were calcined at 400° C. for 3 hours, vigorously screened to remove dust, and given an activity test as described hereinafter.

The above preparation is essentially similar to that of Example 5, except that chromium and copper nitrate were substituted for cobalt nitrate. Such substitution is in keeping with the teachings of that example.

(B) In this case, a slurry of 100 g. of the powder described in the first paragraph of Preparation A, above, and 200 milliliters of distilled water was prepared but no nitrates were included in the slurry used for the coating. This preparation is similar to the preparation described in the above-cited U.S. 3,317,439. The same sintered, nonporous alumina cylinders were used as support. The excess slurry was drained from the cylinders, which were dried with stirring to insure uniformity of deposition of the catalytic powder. These cylinders were then calcined at 400° C., screened to remove loose powder, and tested as described hereinafter.

(C) This sample was prepared by dissolving 41 g. of copper nitrate trihydrate and 68 grams of chromium nitrate nonahydrate in 200 milliliters of distilled water. This solution was poured over 200 grams of ⅛ inch x ⅛ inch support material of the same type as used in Preparations A and B, above. The excess solution was drained away, and the moist cylinders were dried with intermittent stirring to assure uniform distribution of the catalytic materials in and one the cylinders. Thereafter, they were fired at 400° C. to decompose the nitrates to the catalytic oxides. This preparation was similar to conventional prior art processes.

Testing.—Samples from the Preparations A, B, and C were tested as follows:

The catalyst pickup of each sample was determined by weighing the sample. The catalytic activity was determined in the process of carbon monoxide oxidation to carbon dioxide. Fifteen milliliters of each sample was placed in a ½ inch diameter heated tube. The tube was so equipped as to permit gas to enter at the top and leave at the bottom. The gas composition entering the tube and leaving the tube was determined. The gas entering the tube had a space velocity of 25,000 and comprised ⅒% of carbon monoxide in air. The temperature of the tube was maintained, depending on the run, at 150° C., 175° C., 200° C., and 225° C. The exit gas was analyzed at each temperature to determine the amount of carbon monoxide oxidized. The activity of the catalyst is indicated by the amount of oxidation taking place. The results are presented in the table below.

TABLE

| | Catalyst pickup per unit wt. percent | Carbon monoxide oxidation as percent removed | | | |
|---|---|---|---|---|---|
| | | 150° C. | 175° C. | 200° C. | 225° C. |
| Preparation— | | | | | |
| A | 12 | 20 | 100 | 100 | 100 |
| B | 2 | 4 | 5 | 6 | 8 |
| C | 5 | 12 | 16 | 75 | 100 |

It can be seen from the above table that the catalyst prepared by the process of the present invention (Preparation A) has a higher percentage of the catalytic material than either one of the prior art catalysts (B or C). Furthermore, the catalyst of the present invention is more effective in carbon monoxide oxidation since it oxidizes it quantitatively at 175° C., while the next best prior art catalyst oxidizes carbon monoxide quantitatively only at 225° C.

I claim:

1. A supported catalyst, the thickness of the catalytic material on the support being from a monomolecular layer to 10.0 mils, being made by slurrying a catalytic material in finely divided form selected from the group consisting of the oxides, hydroxides, carbonates, chromates, uranates, chromites, cerates, tungstates, vanadates, and molybdates of nickel, cobalt, silver, manganese, iron, chromium, calcium, zinc, tin, bismuth, palladium, platinum, ruthenium, uranium, arsenic, antimony, thallium, copper, the rare earths, elemental platinum, palladium, ruthenium, rhodium, iridium, or osmium, and mixtures thereof in an aqueous solution of at least one nitrate selected from the nitrates of nickel, cobalt, silver, manganese, iron, chromium, calcium, zinc, tin, bismuth, palladium, platinum, ruthenium, uranium, arsenic, antimony, thallium, copper, and the rare earths, the amount of the nitrate being 3–75 weight percent of the slurry; coating the support with said slurry; drying the coating to remove the water originally present in the aqueous slurry; and further heating in sequential steps of increasing temperatures; whereby in the first step the coating is held at a period of at least 5 minutes at the dehydration temperature of any hydrated nitrate present to produce an anhydrous nitrate; in the second step the coating is held at a period of at least 5 minutes at the melting point of the anhydrous nitrate to bond the catalytic material to the support; and in the third step the nitrate is decomposed to crystallites of the corresponding metal oxide.

2. A supported catalyst of claim 1 containing particles not larger than 1500 angstroms in greatest dimension of a refractory material which melts above 1000° C., the amount of said refractory particles being sufficient to act as an interspersant for the crystallites of the metal oxide produced upon decomposition of the metal nitrates and also acting to keep the particles of catalytic materials apart, thereby stabilizing the catalyst against crystallite growth at high temperatures.

3. A supported catalyst of claim 1 wherein the catalytic material is selected from the group consisting of the oxides, carbonates, uranates, chromites, chromates, and cerates of nickel, cobalt, iron, chromium, manganese, tin, bismuth, palladium, platinum, ruthenium and rhodium.

4. A supported catalyst of claim 1 wherein the support material is nonporous.

5. A supported catalyst of claim 1 wherein the support material has a microscopically smooth surface.

6. A process of preparing a supported catalyst consisting essentially of slurrying a catalytic material in finely divided form selected from the group consisting of oxides, hydroxides, carbonates, chromates, uranates, chromites, cerates, tungstates, vanadates and molybdates of nickel, cobalt, silver, manganese, iron, chromium, calcium, zinc, tin, bismuth, palladium, platinum, ruthenium, uranium, arsenic, antimony, thallium, copper, the rare earths; elemental platinum, palladium, ruthenium, rhodium, iridium, or osmium, and mixtures thereof in an aqueous solution of at least one nitrate selected from the nitrates of nickel, cobalt, silver, manganese, iron, chromium, calcium, zinc, tin, bismuth, palladium, platinum, ruthenium, uranium, arsenic, antimony, thallium, copper, and the rare earths, the amount of the nitrate being 3–75 weight percent of the slurry; coating the support with said slurry; drying the coating to remove the water originally present in the aqueous slurry; and further heating in sequential steps of increasing temperatures; whereby in the first step the coating is held at a period of at least 5 minutes at the dehydration temperature of any hydrated nitrate present to produce an anhydrous nitrate; in the second step the coating is held at a period of at least 5 minutes at the melting point of the anhydrous nitrate to bond the catalytic material to the support; and in the third step the nitrate is decomposed to crystallites of the corresponding metal oxide.

7. The process of claim 6 wherein there is also added to the slurry a refractory material having the crystallite size not larger than about 1500 angstroms in greatest dimension and melting above 1000° C.

8. The process of claim 6 wherein the catalytic material is selected from the group consisting of the oxides, carbonates, uranates, chromites and cerates of nickel, cobalt, iron, chromium, manganese, tin, bismuth, palladium, platinum, ruthenium and rhodium.

9. The process of claim 6 wherein the support material is nonporous.

10. The process of claim 6 wherein the support material has a microscopically smooth surface.

11. The process of claim 6 wherein the slurry contains 20–40 weight percent of the nitrate.

References Cited
UNITED STATES PATENTS

| | | | |
|---|---|---|---|
| 3,317,439 | 5/1967 | Stiles | 252—455 |
| 3,513,109 | 5/1970 | Stiles | 252—462 |

DANIEL E. WYMAN, Primary Examiner

W. J. SHINE, Assistant Examiner

U.S. Cl. X.R.

252—461, 463, 464, 465, 466 J, 466 PT, 467, 468, 469, 470, 471, 472, 473, 474, 475, 476